United States Patent [19]

Muramatsu et al.

[11] Patent Number: 5,071,551
[45] Date of Patent: Dec. 10, 1991

[54] WATER PURIFIER

[75] Inventors: Yasuyuki Muramatsu; Yoshihisa Tsujimura, both of Iwata, Japan

[73] Assignee: Kabushiki Kaisha Aiaishi, Japan

[21] Appl. No.: 408,704

[22] Filed: Sep. 18, 1989

[30] Foreign Application Priority Data

Sep. 20, 1988 [JP] Japan .................................. 63-235858

[51] Int. Cl.⁵ ............................................ B01D 36/02
[52] U.S. Cl. ...................................... 210/266; 210/501
[58] Field of Search ................ 210/668, 266, 282-284, 210/501, 502.1, 764

[56] References Cited

U.S. PATENT DOCUMENTS

| | | | |
|---|---|---|---|
| 2,038,171 | 4/1936 | Gudmundsen | 210/501 |
| 3,872,013 | 3/1975 | Mishino et al. | 210/501 |
| 4,492,618 | 1/1985 | Eder | 210/764 |

FOREIGN PATENT DOCUMENTS

| | | |
|---|---|---|
| 0150559 | 8/1985 | European Pat. Off. . |
| 2206278 | 6/1984 | France . |
| 349781 | 6/1931 | United Kingdom . |
| 2197860 | 6/1988 | United Kingdom . |

Primary Examiner—Ivars Cintins
Attorney, Agent, or Firm—Thomas W. Tolpin

[57] ABSTRACT

A water purifier comprising a primary filter for removing residual chlorine and other impurities, a secondary filter disposed downstream of the primary filter for removing microorganisms and antimicrobial means disposed between the primary filter and the secondary filter. The water purifier of the invention can be used for long time since the proliferation of microorganism, which causes clogging of the secondary filter, is effectively prevented.

4 Claims, 3 Drawing Sheets

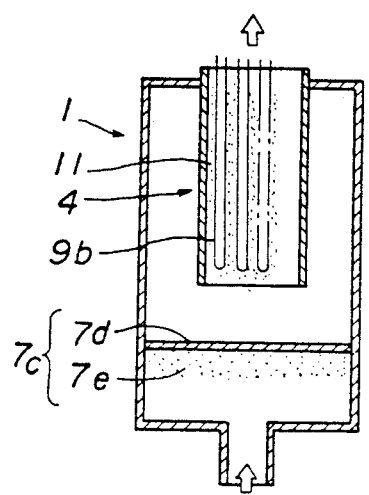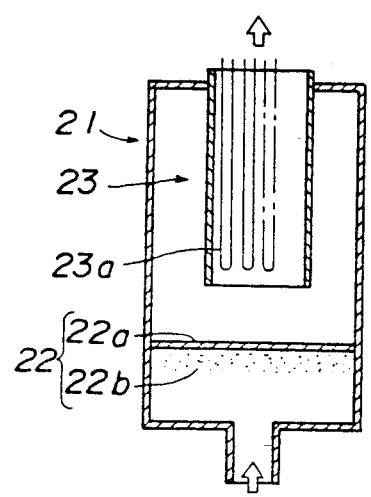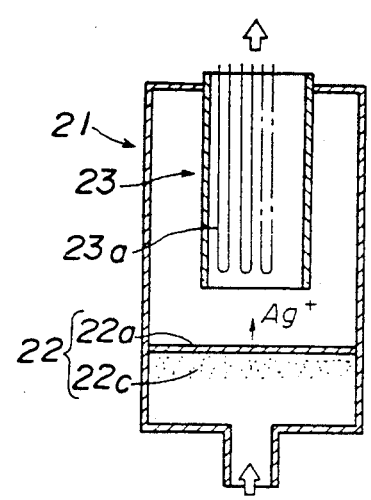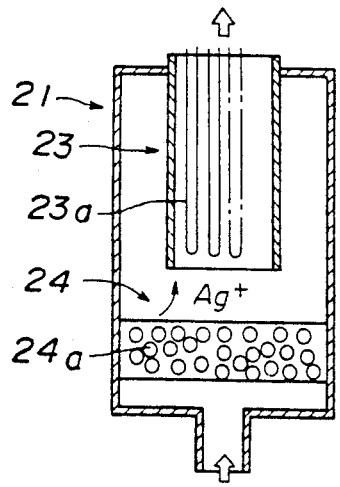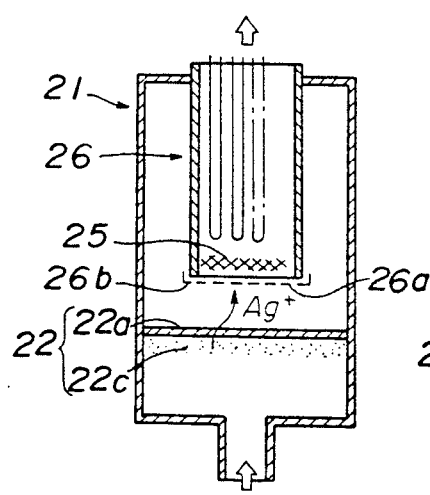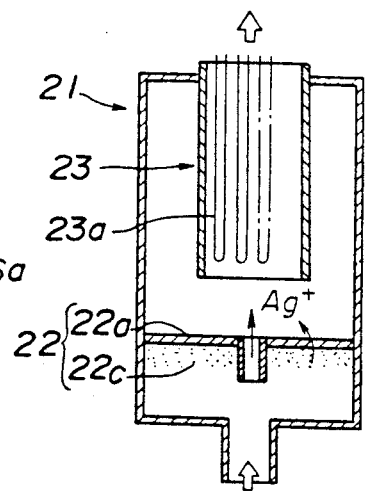

WATER PURIFIER

BACKGROUND OF THE INVENTION

1. Field of the Invention

The present invention relates to a water purifier for removing residual chlorine or the like contained, for example, in the city water and more particularly to the water purifier having a primary filter for removing residual chlorine and a secondary filter disposed downstream of the primary filter with the intention of extending the life of the purifier by preventing the secondary filter from being clogged.

2. Description of the Related Art

The city water generally contains, although the content is very small, some amount of residual chlorine which gives uncomfortable feeling such as odor. In some cases, therefore, the city water has been filtered through a filtering material such as activated carbon to remove the residual chlorine. However, there has been a fear that, if the residual chlorine is removed and if the water is left in a relatively pure state, microorganism such as bacteria, fungi, etc. may proliferate and flow out.

As a water purifier for preventing the microorganism from flowing out, there is an apparatus for example described in the Japanese Utility Model Laid-Open Publication No. 61-22594 wherein a secondary filter for removing the bacteria and consisting of a hollow fiber unit is disposed downstream of the primary filter having granular activated carbon. The problem of the outflow of microorganism described above can be avoided with the water purifier described above.

In the conventional water purifier provided with the primary and secondary filters as described above, however, there has been a disadvantage that microorganisms proliferate between both filters and the proliferated microorganisms clog the secondary filter to considerably shorten the filtering life of the water purifier. In order to eliminate this problem, there has been an example wherein activated carbon applied with silver chloride as the primary filter has been used to suppress the proliferation of microorganism. However, since the proliferation of microorganism between the primary and secondary filters has not been considered in the conventional construction, the filtering life cannot be extended to a large extent.

OBJECT AND SUMMARY OF THE INVENTION

The object of the present invention, in consideration of the problem described above, is to provide a water purifier having a remarkably long filtering life by preventing microorganisms from proliferating between the primary and secondary filters.

The object of this invention is achieved by the provision of a water purifier comprising a primary filter for removing residual chlorine and other impurities in water, a secondary filter disposed downstream of said primary filter for removing microorganisms, and antimicrobial means disposed between said primary filter and said secondary filter.

The antimicrobial means here can be realized either of the following methods: (1) in the case hollow fibers made of plastic such as polyethylene, polypropylene, etc. are used as the secondary filter, antimicrobial agent is either added to the raw material plastic from which the hollow fibers are to be made or applied to the hollow fibers, (2) a antimicrobial filter made by applying the antimicrobial agent to a nonwoven fabric for example is disposed at the intake port of the secondary filter, and (3) city water with the residual chlorine or other sterilizing agent is partially supplied between the primary and secondary filters.

The antimicrobial agent used in this invention must be harmless to human body, and preferably it is water-insoluble to extent its antimicrobial function upon contact with various microorganisms including bacteria and fungi. A specific example of the antimicrobial agent, which may be preferably used in this invention, is zeolite having its skeletal structure containing metallic ions, such as copper or silver ions, or other inorganic antimicrobial elements. Other preferable examples are water-insoluble antimicrobial agents, such as thiobendazole.

As stated before, if the residual chlorine is removed by the primary filter, there is a concern about the proliferation of microorganism and the clogging of the secondary filter. In the present invention, however, the proliferation of microorganism in that part is prevented as the antimicrobial means is disposed between the primary and secondary filters. As a result, there is a almost no possibility of clogging of the secondary filter with microorganism and therefore the filtering life of the water purifier is remarkably extended.

BRIEF DESCRIPTION OF THE DRAWINGS

FIGS. 3(a) through 3(d) are schematic drawings for explaining the test procedure for investigating the filtering life;

FIG. 5 is a schematic drawing showing another embodiment; and

FIG. 6 is a schematic drawing showing one other embodiment.

DESCRIPTION OF THE PREFERRED EMBODIMENT

A preferred embodiment of the invention is explained hereinafter with reference to the drawings in which:

FIGS. 1 through 4 are for explaining a water purifier of an embodiment according to the invention.

Figure 1:
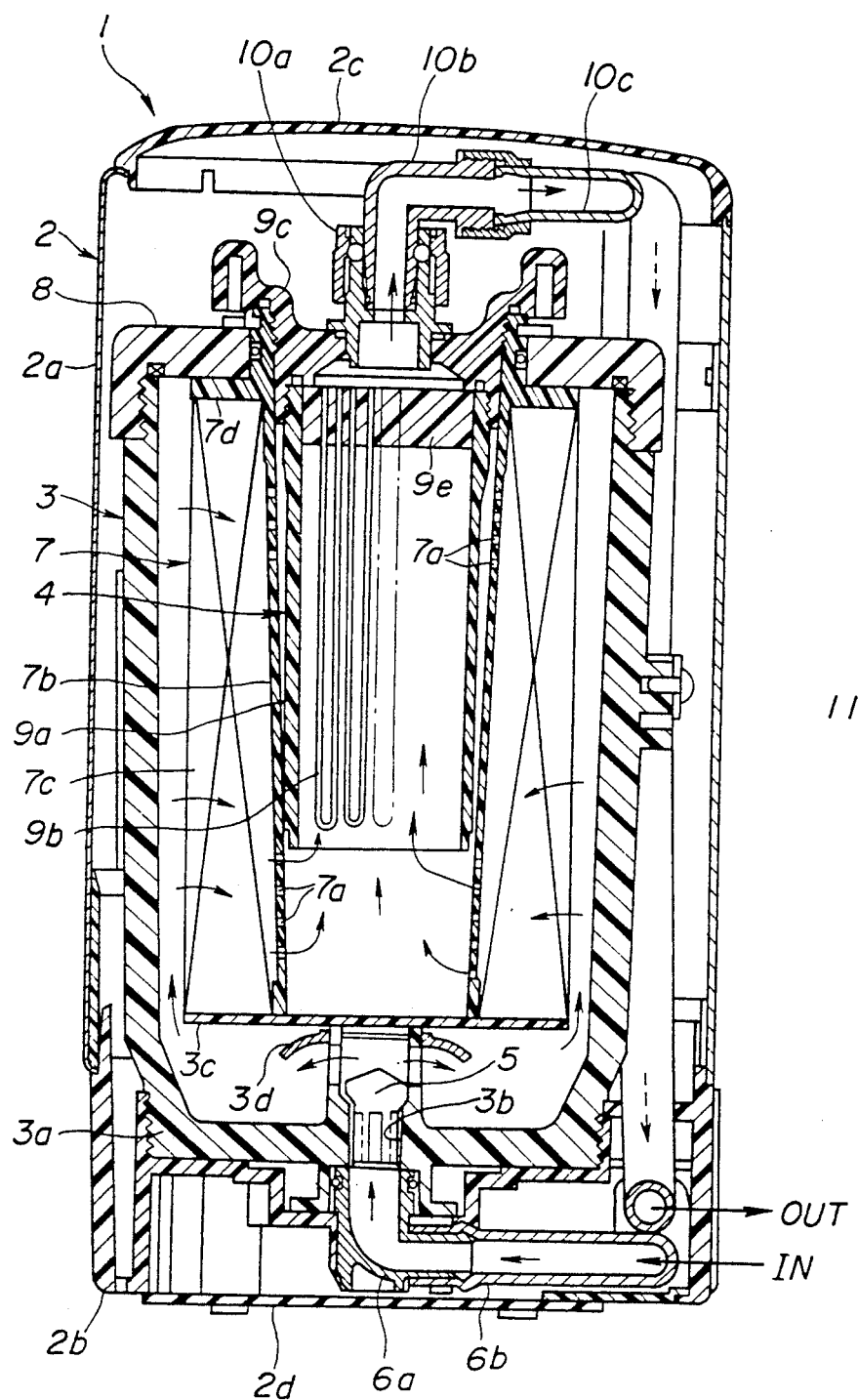
FIG. 1 is a cross-sectional side view of a water purifier of an embodiment of this invention.
Figure 2:
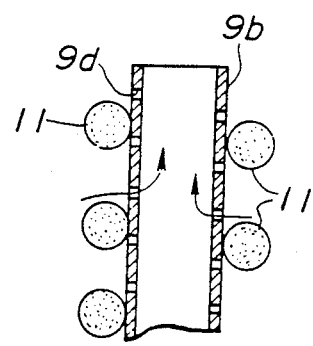
FIG. 2 is an enlarged cross-sectional view of the hollow fiber assembled in the water purifier.

In FIG. 1, a water purifier 1 consists of a main housing 2 and an inner housing 3 holding an activated carbon filter 7 as a primary filter and received in said main housing 2, with a hollow fiber unit 4 as a secondary filter being disposed in said activated carbon filter 7. Said main housing 2 consists of a cylindrical body 2a made of a sheet metal, a plastic bottom 2b detachably attached to the bottom end of said cylindrical body 2a, and a top cover 2c secured to the top end of said cylindrical body 2a.

Said inner housing 3 is disposed and secured in said main housing 2 by screwing its bottom wall portion 3a into the bottom portion 2b of the housing 2. In the center of said bottom wall portion 3a formed is an inlet port 3b, wherein a reverse flow check valve 5 is disposed, and to the upstream side of the port 3b connected is a water supply passage 6b via a connection pipe 6a. The numeral 3d denotes a guide plate. The numeral 2d denotes a bottom cap for covering said water supply passage 6b, etc. and also serving as a slip-stop when the water purifier 1 is placed on a table or the like.

The activated carbon filter 7 received in said inner housing 3 is constituted with a cylindrical support housing 7b provided with plural of communication holes 7a, and a filter 7c surrounding the support housing 7b, with the filter 7c being cylindrically formed with corrugated filter cloth as a porous support applied with activated carbon powder. The activated carbon filter 7 is held between a support plate 3c welded to the bottom of said support housing 7b and an upper flange portion 7d which is in turn depressed with a cap 8 screwed to said inner housing 3.

Said hollow fiber unit 4 consists of a support cap 9c screwed to a protective housing 9a, with the cap 9c in turn being screwed to said support housing 7b. To the support cap 9c is connected a filtered water passage 10c via a coupling 10a and a connection pipe 10b, with the passage 10c being introduced to outside.

A plurality of hollow fibers 9b are housed in said protective housing 9a. The hollow fiber 9b is made of a tubular body of polyethylene or polypropylene provided with innumerable micropores 9d. The hollow fiber 9 is bent in a U-shape and its opening end portion (top end portion in FIG. 1) is secured with a plastic layer 9e to the top end of the protective housing 9a.

The exterior surface of the hollow fiber 9b is treated with antimicrobial treatment. The antimicrobial treatment is to prevent microorganisms such as bacteria, fungi or the like from proliferating in the space between said activated carbon filter 7 and the hollow fibers 9b and is constituted by attaching a antimicrobial agent 11 of for example silver-ion containing zeolite or thiobendazole to the exterior surface of said hollow fiber 9b. In order to attach the antimicrobial agent 11, it has only to put a specified amount of said powdered antimicrobial agent in the protective housing 9a of the hollow fiber unit 4, to put a net over the opening as required, to connect it to the water purifier 1, and to let the city water flow in. This procedure caused the antimicrobial agent 11 diffusedly adhere to the exterior surface of the hollow fiber 9b.

The function of the present embodiment is described below.

In the water purifier 1 of the present embodiment, city water is supplied from the water supply passage 6b, pushes and opens the valve body 5, enters the inside of the inner housing 3, passes through the activated carbon filter 7, passes through the micropores 9d of the hollow fibers 9b, and is taken out of the filtered water passage 10c. In this flow of water, impurities such as residual chlorine is first removed by the activated carbon filter 7. Microorganisms which entered the downstream side of the filter 7 cannot pass through the filtering pores 9d of the hollow fiber 9b and therefore there is no possibility of the microorganism flowing out.

In the case of conventional water purifiers, there has been a problem here that the microorganisms proliferate in the space between the primary and secondary filters and clog the secondary filter. In the present embodiment, however, the antimicrobial agent 11 is attached to the secondary filter of the hollow fibers 9b. Therefore, the microorganisms which have entered the vincinity of the hollow fibers 9b multiply little and the period during which the hollow fibers 9b are clogged is accordingly extended, resulting in a remarkably extended filtering life of the water purifier 1.

Figure 4:
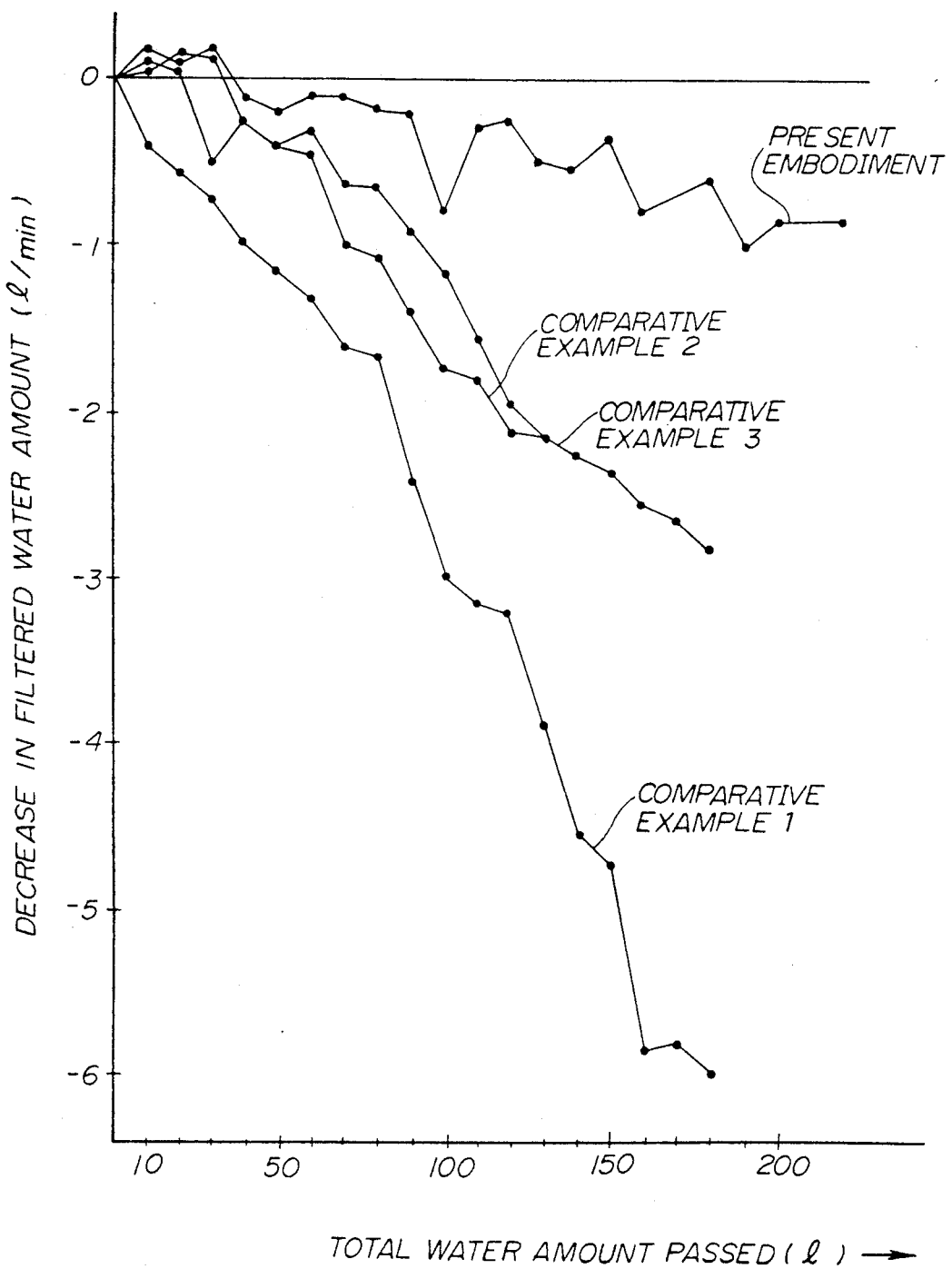
FIG. 4 is a characteristic chart of the total water amount passed vs. filtered water flow rate decrease, showing the test result.

FIGS. 3 and 4 are for explaining the tests for verifying the effects of extending the filtering life of the water purifier 1 according to the present embodiment. FIG. 3(a) is a schematic drawing of the apparatus of the present embodiment and FIGS. 3(b) through 3(d) are schematic drawings of the first to the third comparative examples.

The water purifier 1 according to the present embodiment (FIG. 3(a)) is provided, similar to the manner described heretofore, with a filtering cloth 7d, a filter 7c consisting of activated carbon powder attached with silver chloride, and a hollow fiber unit 4 made of hollow fibers 9b attached with the antimicrobial agent 11.

The water purifier 21 of the comparative example 1 (FIG. 3(b)) is provided with a primary filter 22 consisting of a filtering cloth 22a and ordinary activated carbon powder 22b, and a secondary filter 23 consisting of hollow fibers 23a. A comparative example 2 (FIG. 3(c)) is provided with powder-state activated carbon 22c attached with silver chloride. In a comparative example 3 (FIG. 3(d)), the primary filter body 24 is constituted with a granular activated carbon 24a attached with silver chloride.

Tests were conducted with water purifiers of the construction as described above and having the same filtering capacity, passing 10 l of water every other day, and filtered water flow rate per minute was measured. FIG. 4 shows the test result. The horizontal axis shows the total water amont (liter) which passed the water purifier and the vertical axis shows the variance (l/min) in the measurement of the filtered water flow rate from a reference value per minute.

As seen from FIG. 4, in the comparative examples 1 through 3 where no antimicrobial treatment is applied, the filtered water flow rate (l/min) rapidly decreased as the passed water amount (in proportion to the number of days) increased, showing the fact that their filtering lives are short. In contrast to these, the amount of decrease in the filtered water flow rate of the present embodiment is ⅓ to 1/6 compared with the comparative examples, showing that the filtering life is three to six times those of the comparative examples.

While the anti-microbial agent 11 is attached to the hollow fibers 9b as a antimicrobial means in the embodiment described above, there can be various kinds of variations in the antimicrobial means. For example, the antimicrobial treatment may be performed by mixing the antimicrobial agent into the raw material plastic from which the hollow fibers are manufactured.

It may be also arranged as shown in FIG. 5 that a bactericidal filter 25 made of nonwoven fabric, to which the antimicrobial means similar to that described above is attached, is installed at a water intake port 26a of the hollow fiber unit 26 and is supported with a net 26b.

Furthermore, while the embodiment examples described above used a additional antimicrobial agent, the antimicrobial means of the present invention may be realized for example by introducing a required amount of city water with residual sterilizing agent of chlorine remaining as it is into the space between the primary and secondary filters as shown in FIG. 6.

Since the antimicrobial means is interposed between the primary and secondary filters of the water purifier according to the present invention as described heretofore, microorganism is prevented from proliferating in the space between said filters and, as a result, the filtering life is remarkably extended.

What is claimed is:

1. A water purifier comprising:

a primary filter for removing residual chlorine and other impurities in water, a secondary filter disposed downstream of said primary filter for removing microorganisms, and antimicrobial means disposed between said primary filter and said secondary filter for enhancing the filtering life of said water purifier, said antimicrobial means comprising a water-insoluble antimicrobial agent for exerting antimicrobial function upon contact with microorganisms to substantially prevent microorganisms from proliferating between said primary and secondary filters;

said secondary filter being made of hollow fibers;

said hollow fibers of said secondary filter having an exterior surface; and said antimicrobial agent being attached to said exterior surface of said hollow fibers of said secondary filter.

2. The water purifier of claim 1, wherein said water insoluble antimicrobial agent comprises a zeolite with copper ions.

3. The water purifier of claim 1, wherein said water insoluble antimicrobial agent comprises a zeolite with silver ions.

4. The water purifier of claim 1, wherein said water insoluble antimicrobial agent comprises thiobendazole.

* * * * *